United States Patent
Jensen et al.

(10) Patent No.: US 9,464,609 B2
(45) Date of Patent: Oct. 11, 2016

(54) FUEL DELIVERY SYSTEM INCLUDING INTEGRATED CHECK VALVE

(71) Applicant: Ford Global Technologies, LLC, Dearborn, MI (US)

(72) Inventors: Jacob Jensen, Farmington Hills, MI (US); Dequan Yu, Ann Arbor, MI (US); Dennis Morgan, Canton, MI (US); Christopher Arnold Woodring, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 14/020,576

(22) Filed: Sep. 6, 2013

(65) Prior Publication Data

US 2015/0068491 A1    Mar. 12, 2015

(51) Int. Cl.
| | |
|---|---|
| F02M 69/04 | (2006.01) |
| F02M 1/00 | (2006.01) |
| F02M 37/00 | (2006.01) |
| F16K 47/08 | (2006.01) |
| F16K 15/04 | (2006.01) |

(52) U.S. Cl.
CPC ...... F02M 37/0041 (2013.01); F02M 37/0023 (2013.01); F16K 15/044 (2013.01); F16K 47/08 (2013.01); *Y10T 137/0396* (2015.04); *Y10T 137/85978* (2015.04)

(58) Field of Classification Search
CPC .............. F02M 37/20; F02M 37/025; F02M 37/0029; F02M 37/0023; F02M 5/12; F02M 21/0239; F02M 37/0017; B60K 15/077; F16L 37/34; F16K 15/033; H02K 5/12
USPC .......... 123/445, 459, 495, 516, 506
See application file for complete search history.

(56) References Cited

U.S. PATENT DOCUMENTS

| | | | | |
|---|---|---|---|---|
| 2,810,347 | A | * | 10/1957 | Rippingille ............. 417/383 |
| 4,044,746 | A | * | 8/1977 | Kaye ............. 123/511 |
| 4,295,412 | A | * | 10/1981 | Hachiro ............. 91/468 |
| 4,492,249 | A | * | 1/1985 | Arino et al. ............. 137/515 |
| 4,730,652 | A | * | 3/1988 | Bartholomew ............. 141/302 |
| 4,852,680 | A | * | 8/1989 | Brown et al. ............. 180/287 |
| 4,955,407 | A | * | 9/1990 | Inoue ............. 137/454.2 |
| 5,099,878 | A |   | 3/1992 | Boehmer |

(Continued)

FOREIGN PATENT DOCUMENTS

| | | |
|---|---|---|
| EP | 0995902 A2 | 4/2000 |
| EP | 1921307 A1 | 5/2008 |
| EP | 2378121 A1 * | 10/2011 |

OTHER PUBLICATIONS www.plasticseuropoe.org/information-centre/education-portal/resources-room/abc-of-plastics/the-abc-of-polyethylene.aspx.*

*Primary Examiner* — Marguerite McMahon
*Assistant Examiner* — Tea Holbrook
(74) *Attorney, Agent, or Firm* — James Dottavio; Alleman Hall McCoy Russell & Tuttle LLP

(57) ABSTRACT

A fuel delivery system is provided to reduce the pressure pulsations and noise vibration and harshness of direct injection systems. The fuel delivery system includes an elastic fuel line positioned between a first fuel pump and a second fuel pump and a check valve positioned in the elastic fuel line near the inlet of the high pressure pump, the check valve including an external housing having a peripheral surface with a greater diameter than an unstretched inner diameter of the elastic fuel line.

17 Claims, 5 Drawing Sheets

(56) References Cited

U.S. PATENT DOCUMENTS

| | | | |
|---|---|---|---|
| 5,251,664 A | 10/1993 | Arvidsson et al. | |
| 5,329,899 A * | 7/1994 | Sawert et al. | 123/198 DB |
| 5,511,528 A | 4/1996 | Iwanaga et al. | |
| 6,019,348 A * | 2/2000 | Powell | 251/144 |
| 6,056,029 A * | 5/2000 | Devall et al. | 141/383 |
| 6,058,912 A * | 5/2000 | Rembold et al. | 123/516 |
| 6,502,607 B2 * | 1/2003 | Brown et al. | 141/1 |
| 6,789,568 B1 * | 9/2004 | Bunnell et al. | 137/527.8 |
| 6,929,023 B2 * | 8/2005 | Whitaker et al. | 137/315.33 |
| 7,128,346 B2 * | 10/2006 | Miyajima et al. | 285/204 |
| 7,444,990 B1 * | 11/2008 | Fisher et al. | 123/459 |
| 8,475,614 B2 * | 7/2013 | Criel et al. | 156/92 |
| 8,622,047 B2 * | 1/2014 | Blom et al. | 123/458 |
| 2002/0185113 A1 * | 12/2002 | Kato | 123/456 |
| 2002/0189711 A1 * | 12/2002 | Yonezawa et al. | 141/301 |
| 2003/0209282 A1 * | 11/2003 | Satou et al. | 141/97 |
| 2004/0160052 A1 * | 8/2004 | Marsala et al. | 280/834 |
| 2004/0177884 A1 * | 9/2004 | Konishi | 137/540 |
| 2006/0099368 A1 * | 5/2006 | Park | 428/36.91 |
| 2008/0283026 A1 * | 11/2008 | Wolber et al. | 123/447 |
| 2009/0283068 A1 * | 11/2009 | Willison | 123/27 R |
| 2009/0298365 A1 * | 12/2009 | Kato et al. | 440/88 F |
| 2012/0289894 A1 * | 11/2012 | Douglas et al. | 604/31 |
| 2013/0273289 A1 * | 10/2013 | Luo et al. | 428/36.91 |
| 2014/0110029 A1 * | 4/2014 | Benedict et al. | 152/429 |
| 2014/0263697 A1 * | 9/2014 | McAlister | 239/5 |

* cited by examiner

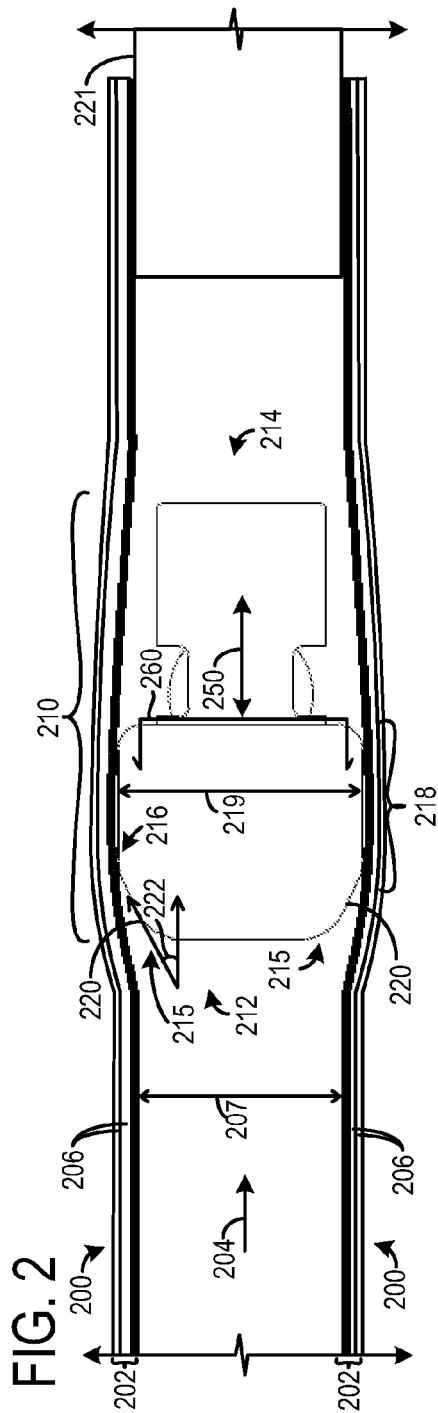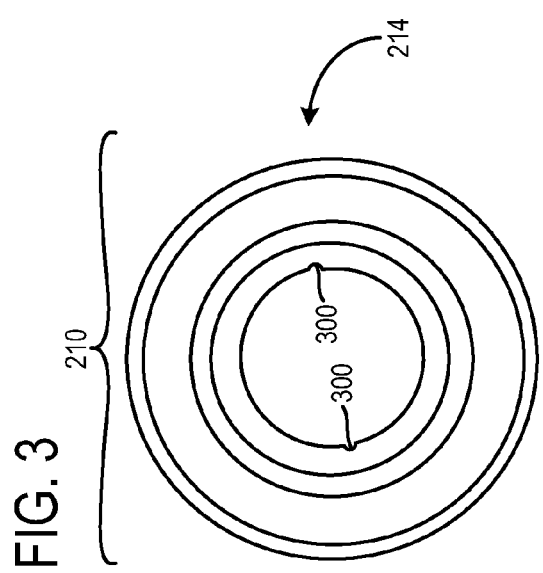

FUEL DELIVERY SYSTEM INCLUDING INTEGRATED CHECK VALVE

FIELD

The present disclosure relates to a fuel delivery system in an engine.

BACKGROUND AND SUMMARY

Fuel delivery systems are used in vehicles to provide fuel to cylinders in the engine. Some fuel delivery systems may include multiple fuel pumps, such as a high pressure fuel pump and a low pressure fuel pump, to providing high pressure fuel to the cylinders. Increasing the pressure of the fuel delivery system may enable combustion efficiency to be increased, thereby reducing fuel consumption and/or increasing power output. However, fuel delivery systems may experience pressure pulsations in a variety of locations in the system. For instance, pressure pulses may be experienced between the fuel pumps and between the fuel rail and the high pressure fuel pump. As a result, the longevity of the pumps, fuel rail, etc., may be decreased due to the degradation of components caused by the pressure pulsations in the system. These pressure pulsations may also negatively affect the metering of the fuel provided to the combustion chamber, thereby reducing combustion efficiency. Moreover, the noise, vibration, and harshness (NVH) caused by the pulsations also decreases customer satisfaction.

U.S. Pat. No. 5,251,664 discloses a check valve in a fuel delivery system between a pump and a fuel tank. The check valve is designed to reduce ticking noise generated during valve operation. It will be appreciated that the check valve disclosed in U.S. Pat. No. 5,251,664 is configured to connect to an upstream and downstream fuel conduit. Furthermore, the check valve disclosed in U.S. Pat. No. 5,251,664 is a standalone component in the fuel delivery system. As a result, the bulkiness of the fuel delivery system is increased. Moreover, the valve disclosed in U.S. Pat. No. 5,251,664 is L-shaped. This type of shape increases losses in the fuel delivery system.

The inventors herein have recognized the above issues and developed a fuel delivery system. The fuel delivery system includes an elastic fuel line positioned between a first fuel pump and a second fuel pump and a check valve positioned in the elastic fuel line, the check valve including an external housing having a peripheral surface with a greater diameter than an unstretched inner diameter of the elastic fuel line. Sizing of the check valve and corresponding fuel line in this way enables the check valve to be securely fitted into the fuel line. Specifically, the stretched fuel line exerts a radial force on the check valve to secure the valve in a desired location in the fuel line. In this way, the check valve may be easily integrated into existing fuel lines without introducing a standalone check valve unit, if desired. As a result, the compactness of the fuel delivery system can be increased. Moreover, the check valve attenuates pressure pulsations in the fuel line, thereby reducing NVH in the fuel delivery system. Thus, the technical results achieved via the aforementioned engine system include increasing the system's compactness and decreasing pulsations in the fuel delivery system, thereby increasing the system's longevity and decreasing NVH in the system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 2 shows an illustration of an example check valve positioned in an elastic fuel line;

FIG. 3 shows an illustration of another view of the check valve shown in FIG. 2;

DETAILED DESCRIPTION

A fuel delivery system is described herein. The fuel delivery system includes check valve positioned in an elastic fuel line. The check valve includes an external housing having a peripheral surface with a greater diameter than an unstretched inner diameter of the elastic fuel line. Sizing the check valve and fuel line in this manner enables the check valve to be securely integrated into the fuel line, without splitting the fuel line to add a standalone check valve assembly, if desired. As a result, the compactness of the fuel delivery system may be increased through the integration of the check valve into an existing fuel line, if desired. Additionally, it will be appreciated that the pressure pulsations may be generated by operation of a fuel pump upstream of the check valve. It will be further appreciated, that the check valve is configured to enable fuel to flow therethrough in a downstream direction when the pressure in the fuel line exceeds a threshold value. As a result pressure pulsations in the fuel line are reduced. Consequently, NVH in the fuel delivery system is reduced, thereby increasing fuel delivery system component longevity and customer satisfaction.

Figure 1:
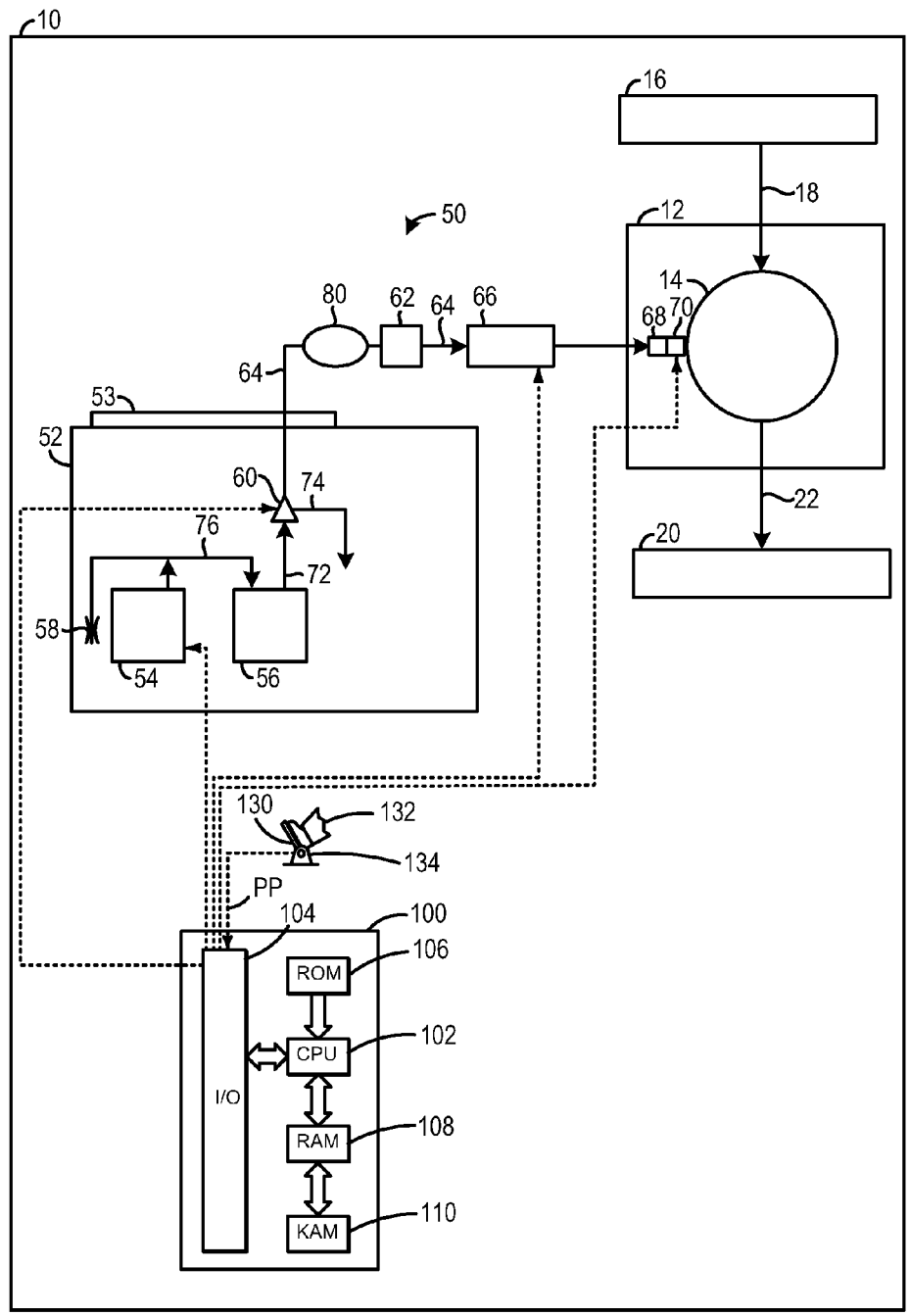
FIG. 1 shows a schematic depiction of a vehicle having an engine and a fuel delivery system.

FIG. 1 shows a schematic depiction of a vehicle 10 including an engine 12. The engine 12 is configured to implement combustion operation. For example, a four stroke combustion cycle may be implemented including an intake stroke, a compression stroke, a power stroke, and an exhaust stroke. However, other types of combustion cycles may be utilized in other examples. In this way, motive power may be generated in the vehicle 10. It will be appreciated that the engine may be coupled to a transmission for transferring rotation power generated in the engine to wheels in the vehicle.

The engine 12 includes a cylinder 14. However, engines having a different number of cylinders and configurations have been contemplated. For instance, the cylinder may be arranged in an inline configuration where the cylinders are positioned in a straight line, a horizontally opposed configuration, a V-configuration, etc. Thus, the cylinders may be arranged in banks, in one example. The cylinder 14 is mechanically coupled to a crankshaft (not shown).

The vehicle 10 includes an intake system 16 configured to provide air to the cylinder 14. The fluidic communication between the intake system 16 and the cylinder 14 is denoted via arrow 18. The intake system 16 may include a variety of components such as intake conduits, filters, a throttle, an intake manifold, etc.

The vehicle 10 further includes an exhaust system 20 configured to receive exhaust gas from the cylinder 14. The fluidic communication between the cylinder 14 and the exhaust system 20 is denoted via arrow 22. The exhaust system 20 may include exhaust conduits, an exhaust manifold, emission control devices (e.g., particulate filters, catalysts), etc.

The vehicle 10 further includes a fuel delivery system 50 configured to provide fuel to the cylinder 14. The fuel delivery system 50 includes a fuel tank 52 configured to store a suitable combustible fuel such as gasoline, diesel, alcohol, etc. The fuel tank 52 includes a flange 53, in the depicted example. The flange 53 is secured to the tank and provides a mounting feature for the fuel delivery module.

A lower pressure fuel pump 54 is also included in the fuel delivery system 50. The lower pressure fuel pump 54 is enclosed in the fuel tank 52, in the depicted example. However in other examples, the lower pressure fuel pump 54 may be positioned at least partially outside of the lower pressure fuel pump 54. The lower pressure fuel pump 54 is configured to flow fuel to downstream components.

A fuel filter 56 included in the fuel delivery system 50 is positioned downstream of the lower pressure fuel pump 54 and therefore is in fluidic communication with the lower pressure fuel pump. The fuel filter 56 is configured to remove unwanted particulates from the fuel flowing therethrough. A restriction device 58 is also in fluidic communication with the lower pressure fuel pump 54. The restriction device 58 is configured to move inaccessible fuel to the fuel delivery module.

A valve 60 is positioned downstream of the fuel filter 56 and therefore is in fluidic communication with the fuel filter 56 and the lower pressure fuel pump 54. The valve 60 is a two-way valve, in the depicted example. The valve 60 has a first configuration permitting fuel to flow to downstream components. The valve 60 has a second configuration inhibiting fuel from flowing to downstream components and permitting fuel to flow back into the fuel tank 52. The valve 60 may be electronically controlled via the controller 100, in one example an electrical solenoid valve. However, in other examples the valve 60 may be passively controlled.

A check valve 62 is also included in the fuel delivery system 50. The check valve 62 is configured to permit fuel to flow therethrough in a downstream direction when the pressure of the fuel in the fuel line upstream of the valve exceeds a threshold value. The check valve 62 is integrated into the fuel line 64, in the depicted example. The fuel line 64 extends from the valve 60 to a higher pressure fuel pump 66. Thus, the fuel line 64 provides fluidic communication between the valve 60 and the higher pressure fuel pump 66. The check valve 62 is discussed in greater detail herein with regard to FIGS. 2-4. The higher pressure fuel pump 66 is in fluidic communication with the check valve 62. Therefore, the check valve 62 is positioned between the higher pressure fuel pump 66 and the lower pressure fuel pump 54. The higher pressure fuel pump 66 is in fluidic communication with a fuel rail 68 and a fuel injector 70 providing metered amounts of fuel to the cylinder 14. The fuel injector 70 is directly coupled to the cylinder 14 to provide what is known in the art as direct injection to the cylinder. Therefore, the fuel injector 70 may be referred to as a direct fuel injector. Additionally or alternatively, the port fuel injection may also be provided in the engine 12.

A fuel line 72, denoted via an arrow, provides fluidic communication between the valve 60 and the fuel filter 56. Additionally, a return fuel line 74 is in fluidic communication with the valve 60 and includes an outlet opening into the fuel tank 52. A fuel line 76 also provides fluidic communication between the lower pressure pump 54 and the fuel filter 56. It will be appreciated that the aforementioned fuel lines are included in the fuel delivery system 50. The fuel delivery system 50 may also include an external filter to increase filtration of fuels. 80

A controller 100 may be included in the vehicle 10. The controller 100 may be configured to receive signals from sensors in the vehicle as well as send command signals to components. Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. As shown, the lower pressure fuel pump 54 and the higher pressure fuel pump 66 receive control signals from the controller 100. Therefore, the controller 100 may adjust the output of the fuel pumps (54 and 66). The fuel injector 70 also receives a control signal from the controller 100. Therefore, the fuel injector 70 may also be configured to adjust the amount and timing of the fuel delivered to the cylinder 14 from the fuel injector 70. The valve 60 also receives a control signal from the controller 100.

FIG. 2 shows an example elastic fuel line 200. The fuel line 200 may be similar to the fuel line 64 shown in FIG. 1. Therefore, the elastic fuel line 200 may be in fluidic communication with a higher pressure fuel pump, such as the higher pressure fuel pump 66 shown in FIG. 1, and a lower pressure fuel pump, such as the lower pressure fuel pump 54 shown in FIG. 1. Specifically in one example, the elastic fuel line 200 may extend between a lower pressure fuel pump and a higher pressure fuel pump. As shown, the fuel line 200 including a housing 202. Fuel flows through the elastic fuel line 200 in the direction indicated via arrow 204. The elastic fuel line 200 includes a plurality of layers 206. Thus, the elastic fuel line is a multi-layer fuel line, in the depicted example. However, in other examples, the elastic fuel line may include only a single layer. Additionally, the elastic fuel line 200 has an unstretched inner diameter 207. It will be appreciated that the unstretched inner diameter includes a state of the fuel line where a substantially equal pressure is exerted on the inside and outside of the fuel line.

A check valve 210 is positioned in the fuel line 200. The check valve 210 may be similar to the check valve 62, shown in FIG. 1. The fuel line 200 at least partially encloses the check valve 210. The check valve 210 including an upstream end 212 (e.g., leading end) and a downstream end 214 (e.g., trailing end). The upstream end 212 includes a curved leading surface 215. Additionally, the outer diameter of the upstream end 212 is greater than the outer diameter of the downstream end 214. The curvature of this surface enables the valve to be inserted into the fuel line 200 without causing damage to the fuel line housing. As shown, the downstream end 214 is spaced away from the housing 202 of the elastic fuel line 200. In other words, the downstream end 214 is not coupled or secured to the housing 202. The check valve 210 is configured to permit fuel to flow therethrough in a downstream direction when the pressure in the elastic fuel line 200 upstream of the valve surpasses a threshold value. In one example, the threshold value is a few kpa higher than the downstream pressure. It will be appreciated that the check valve 210 attenuates pressure pulses traveling through the fuel line 200, thereby reducing NVH in the fuel delivery system. As a result, the likelihood of component degradation is decreased and component longevity is increased. Additionally, customer satisfaction is also increased when the NVH is reduced. The check valve 210 further includes an external housing 216 having a peripheral surface 218. The peripheral surface 218 is the outermost valve surface and is in face sharing contact with the housing 202 of the elastic fuel line 200, in the depicted example. In this way, fuel may be substantially inhibited from flowing between the peripheral surface and the housing. Furthermore, it will be appreciated that the external housing 216 includes additional peripheral surfaces which have smaller diameters/radii than the outermost peripheral surface. The external housing 216 encloses valve componentry such as a spring, valve channels, etc. The diameter 219 of the peripheral surface 218 is illustrated. Further in the depicted example, a cross-section of the peripheral surface perpendicular to a central axis 250 of the check valve is circular. However, other check valve geometries have been contemplated.

In one example, the diameter 219 of the peripheral surface is greater than 105% of the unstretched inner diameter 207 of the elastic fuel line. Further in one example, the diameter 219 of the peripheral surface is between 101% and 120% of the unstretched inner diameter 207 of the elastic fuel line. Still further in one example, the diameter 219 of the peripheral surface is less than 5% a maximum threshold stretch of the elastic fuel line 200. In this way, the check valve 210 may be secured in a desired location via an elastic force exerted on the valve via the elastic fuel line without stretching the elastic fuel line beyond a desired value, which may damage the line. As a result, the check valve 210 is internally integrated into the fuel line, thereby increasing the compactness of the fuel delivery system. Additionally, a ratio of an outer diameter of the upstream end 212 and the diameter of the peripheral surface 218 is 115 to 125%.

Furthermore, the elasticity of the fuel line 200 may be up to 130% of original size. Additionally, the elasticity of the fuel line 200 is greater than the elasticity of the check valve 210. Furthermore, the elasticity of the fuel line 200 may be greater than the elasticity of upstream and/or downstream fuel lines in the fuel delivery system, in one example.

Additionally, a tapered surface 220 of the external housing 210 extends from the upstream end 212 to the outermost peripheral surface 218. A divergent angle 222 of the tapered surface 220 extending from the upstream end 212 is between 20° and 40°. Additionally, in one example, the downstream end 214 of the check valve 210 is positioned greater than 15 mm from an end of the elastic fuel line 200.

A quick connect 221 is also shown in FIG. 2. The quick connect 221 is coupled to the elastic fuel line 200. Additionally, the quick connect 221 may be coupled to downstream components such as a higher pressure fuel pump or a fuel line. It will be appreciated that the quick connect may include a barbed feature for sealing on fuel line. In one example, the quick connect 221 may be spaced at least 5 millimeters (mm) away from the downstream end 214 of the check valve 210. The cutting plane 260 defining the cross-section shown in FIG. 3 is also illustrated in FIG. 2.

FIG. 3 shows a cross-sectional view of the check valve 210 shown in FIG. 2. Specifically, FIG. 3 shows the downstream end 214 of the check valve 210. The check valve 210 includes weep channels 300 configured to allow for bleed off of fuel during non-operating conditions.

Figure 4:
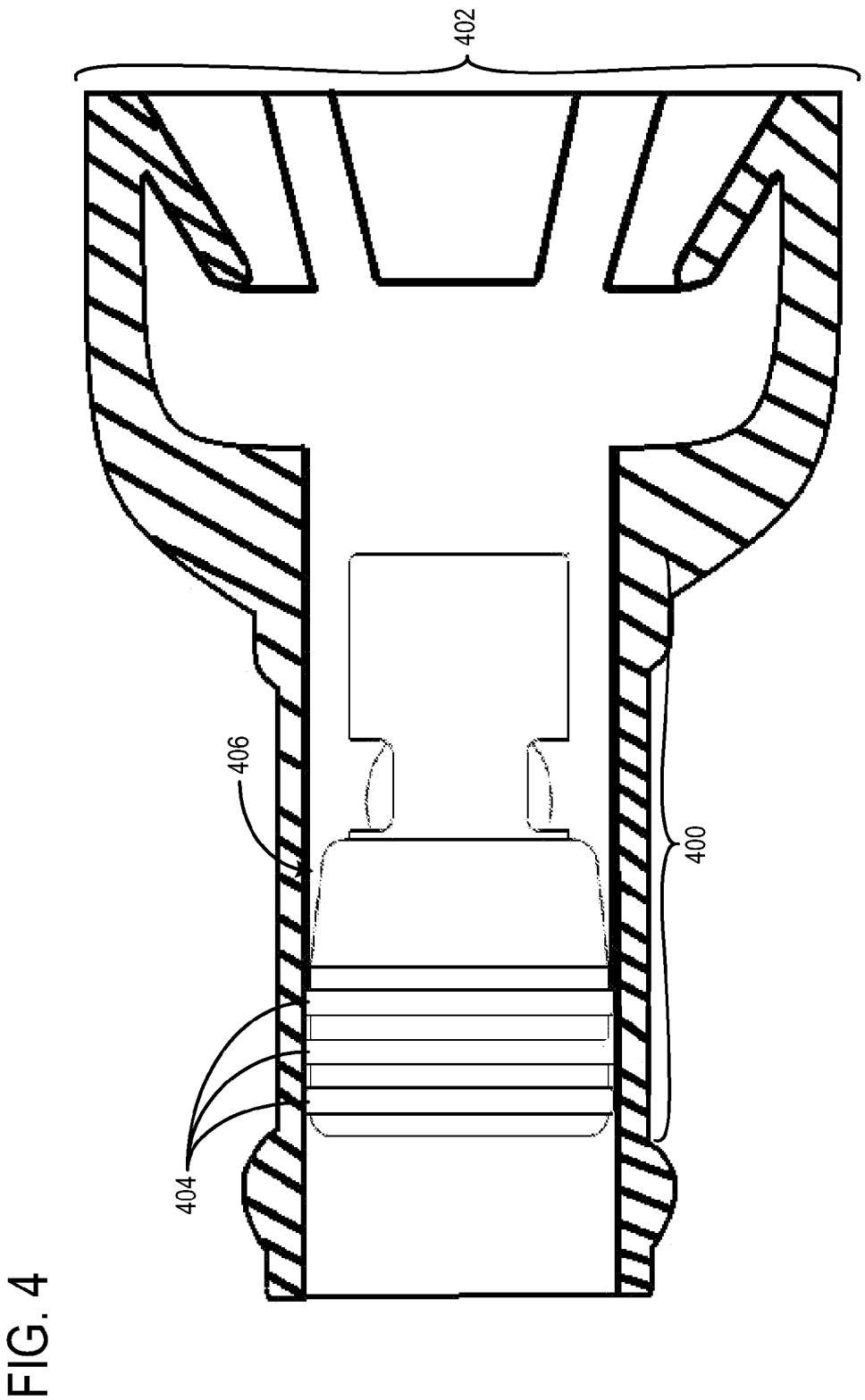
FIG. 4 shows another example check valve positioned in a fuel line.

FIG. 4 shows an example check valve 400 positioned in a device 402. The device 402 may be a quick connect device, in one example. In such an example, the quick connect device may be positioned between a higher pressure fuel pump and a lower pressure fuel pump shown in FIG. 1. Additionally, the quick connect device may comprise plastic and/or steel. In another example, the device 402 may be a higher pressure pump fitting.

As illustrated, the check valve 400 includes a plurality of teeth 404 circumferentially extending around the valve housing 406, is part of the quick connect body or can be part of a high pressure pump inlet fitting. The teeth 404 are formed by raised sections and depressed sections. Thus, the teeth may also be thought of as recessed channels. As shown, the teeth have an equivalent external circumference. However, in other examples the circumference of the teeth may vary along their lengths and/or vary between the teeth. The teeth 404 are spaced about one millimeter apart and have a height of about half a millimeter, these teeth 404 can be flat or have a special feature to allow for proper retention of the check valve.

Figure 5:
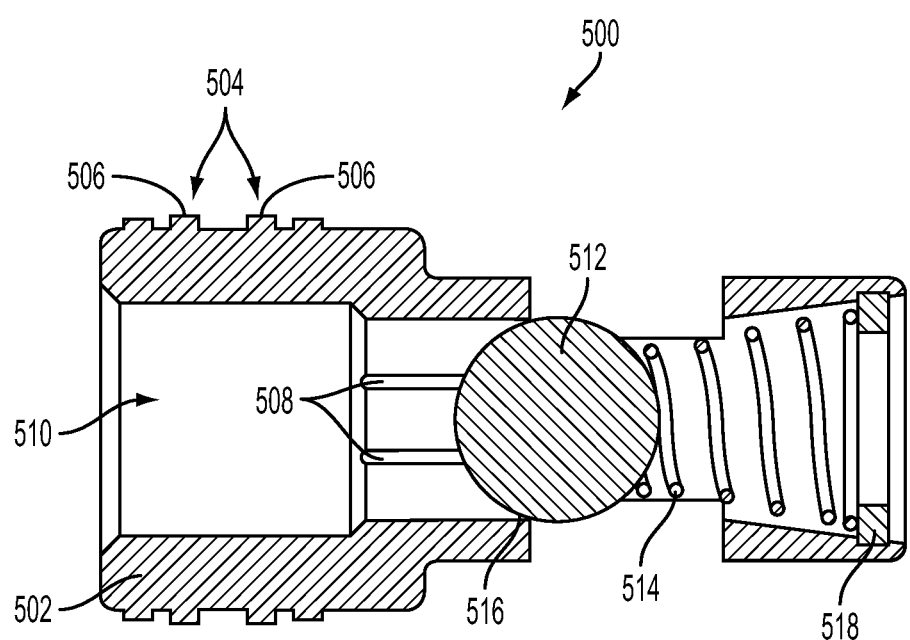
FIG. 5 shows another example check valve.

FIG. 5 shows another example check valve 500. Specifically, a cross-section of the check valve 500 is depicted. The check valve 500 includes an external housing 502. Additionally, the check valve 500 includes teeth 504. The teeth 504 are included in the housing 502. Furthermore, the teeth 504 include peripheral surfaces 506. The peripheral surfaces of one or more of the teeth may be greater than an unstretched inner diameter of an elastic fuel line in which the check valve 500 is positioned. Thus, it will be appreciated that the check valve 500 may be positioned in an elastic fuel line, such as the elastic fuel line 200 shown in FIG. 2.

Continuing with FIG. 5, weep channels 508 in the check valve 500 are depicted. Additional weep channel may also be included in the check valve 500. Specifically, the additional weep channels may be included in the peripheral surface of the valve. For example, the weep channels may extend through the teeth. The weep channels 508 in the check valve 500 are configured to allow for bleed off of fuel during non-operating conditions. Specifically, the weep channels 508 may enable fuel to flow from opening 510 through the valve past an obstruction element 512 (e.g., ball) included in the valve 500. It will be appreciated that the size of the weep channels may be selected based on desired bleed off characteristics of the valve.

The obstruction element 512 is attached to a spring 514. The obstruction element 512 and spring 514 may work in conjunction to permit and inhibit flow through the check valve 500 based on the pressure the fuel line or other component upstream of the valve. The obstruction element 512 seats and seals on an inner surface 516 of the check valve 500 in a closed configuration. In an open configuration the obstruction element 512 is spaced away from the inner surfaced 516 and enables fuel to flow through the valve in a downstream direction. Additionally, the spring 514 is coupled to a stopper 518. The stopper 518 may confine movement of the spring 514.

Figure 6:
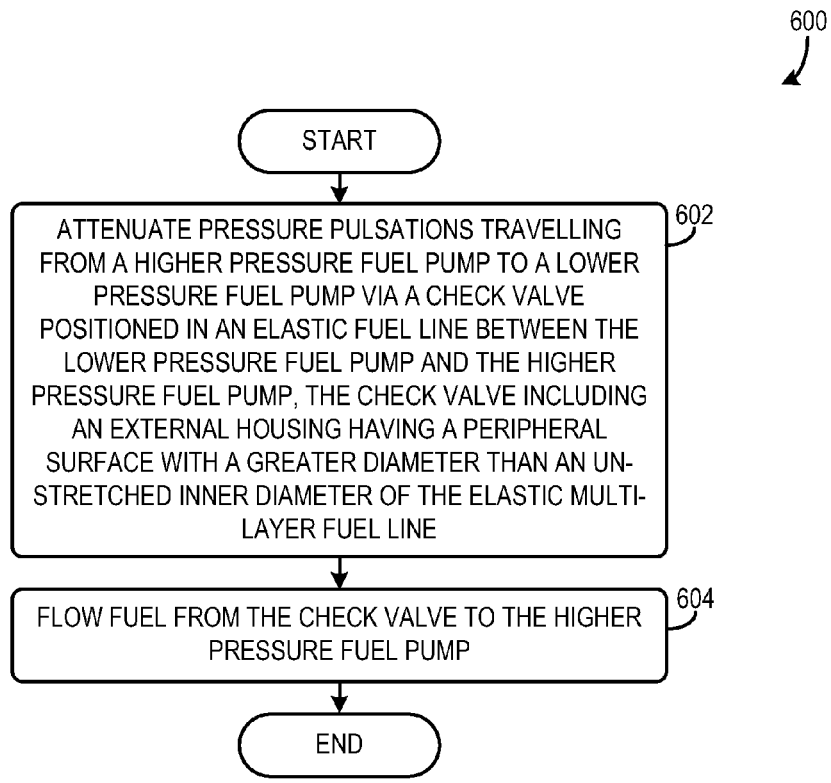
FIG. 6 shows a method for operation of a fuel delivery system.

FIG. 6 shows a method 600 for operation of a fuel delivery system. The method 600 may be implemented via the fuel delivery system 50 discussed above with regard to FIG. 1 or may be implemented via another suitable fuel delivery system.

The method includes at 602 attenuating pressure pulsations travelling from a higher pressure fuel pump to a lower pressure fuel pump via a check valve positioned in an elastic fuel line between the higher pressure fuel pump and the lower pressure fuel pump, the check valve including an external housing having a peripheral surface with a greater diameter than an unstretched inner diameter of the elastic multi-layer fuel line. In this way, the check valve may be secured in the fuel line via an elastic return force exerted on the valve via the fuel line. As a result, the check valve may be integrated into an existing fuel line, decreasing the cost of the fuel delivery system and increasing system's compactness, if desired. In one example, the check valve configured to enable fuel flow there through when the upstream fuel pressure in the elastic fuel line exceeds the downstream fuel pressure. As a result, the check valve reduces NVH in the fuel delivery system, thereby increasing components longevity and customer satisfaction. Next at 604 the method includes flowing fuel from the check valve to the high pressure fuel pump.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel delivery system comprising:
an elastic fuel line for gasoline or diesel fuel positioned between a first fuel pump and a second fuel pump; and
a check valve internally integrated into the elastic fuel line, the check valve including an external housing having a peripheral surface with a greater diameter than an unstretched inner diameter of the elastic fuel line, the external housing having an upstream end and a downstream end, the downstream end spaced away from the elastic fuel line, wherein an elasticity of the elastic fuel line is greater than an elasticity of the check valve, wherein a leading edge of the upstream end has a curved tapered leading surface, where a divergent angle of the curved tapered leading surface extending from the upstream end of the check valve is between 20° and 40° from a central axis, and where the curved tapered leading surface is spaced away from the elastic fuel line and tapers and curves away from an inner surface of the elastic fuel line to a greater degree than the fuel line curves or tapers due to its elastic expansion from the check valve inserted therein, where the elastic fuel line is coupled to a quick connect downstream of the check valve, the quick connect spaced at least 5 millimeters (mm) away from the downstream end of the check valve, the quick connect coupled to the second fuel pump.

2. The fuel delivery system of claim 1, where the fuel line is a multi-layer fuel line positioned in a vehicle, and wherein the curved tapered leading surface is curved from the most upstream end to an outermost peripheral surface, wherein the second fuel pump is a higher pressure fuel pump than the first fuel pump.

3. The fuel delivery system of claim 2, where the fuel line is a nylon fuel line.

4. The fuel delivery system of claim 1, where the check valve includes a plurality of teeth circumferentially extending around an outer surface of the check valve.

5. The fuel delivery system of claim 4, where the check valve includes weep channels directly connecting upstream and downstream for bleeding a high pressure side back into a low pressure side of the system during non-running conditions.

6. The fuel delivery system of claim 5, where the diameter of the peripheral surface of the external housing is greater than 105% of the unstretched inner diameter of the fuel line.

7. The fuel delivery system of claim 1, where the diameter of the peripheral surface of the external housing is between 101% and 140% of the unstretched inner diameter of the fuel line.

8. The fuel delivery system of claim 1, where the downstream end of the check valve is positioned between 50 mm and 100 mm from an end of the elastic fuel line.

9. The fuel delivery system of claim 1, where a cross-section of the peripheral surface perpendicular to the central axis of the check valve is circular.

10. A fuel delivery system of a vehicle comprising:
an elastic multi-layer fuel line for gasoline or diesel fuel positioned between a lower pressure fuel pump and a higher pressure fuel pump;
a check valve internally integrated into the elastic multi-layer fuel line, the check valve including an external housing having a peripheral surface with a greater diameter than an unstretched inner diameter of the elastic multi-layer fuel line and a curved and tapered leading surface, the peripheral surface being an outermost valve surface and in face-sharing contact with the elastic multi-layer fuel line, wherein the curved and tapered leading surface is formed at a divergent angle extending from an upstream end of the check valve between 20° and 40°, and where the curved and tapered leading surface is spaced away from the elastic fuel line and tapers and curves away from an inner surface of the elastic fuel line to a greater degree than the fuel line curves due to its elastic expansion from the check valve inserted therein, where the elastic fuel line is coupled to a quick connect downstream of the check valve, the external housing further comprising a downstream peripheral surface not in face-sharing contact with the elastic multi-layer fuel line, wherein an elasticity of the elastic multi-layer fuel line is greater than an elasticity of the check valve; and a direct fuel injector in fluidic communication with the higher pressure fuel pump and directly coupled to a cylinder.

11. The fuel delivery system of claim 10, where the diameter of the peripheral surface of the external housing is between 101% and 140% of the unstretched inner diameter of the fuel line.

12. The fuel delivery system of claim 11, where the check valve includes weep channels directly connecting upstream and downstream for bleeding a high pressure side back into a low pressure side of the system during non-running conditions.

13. The fuel delivery system of claim 12, where a ratio of an outer diameter of the upstream end of the check valve and the diameter of the peripheral surface is 1.2 to 1.4.

14. The fuel delivery system of claim 13, where the diameter of the peripheral surface of the external housing is less than 5% of maximum threshold stretch of the elastic multi-layer fuel line.

15. The fuel delivery system of claim 14, where the elasticity of the elastic multi-layer fuel line is greater than the elasticity of the check valve.

16. A method for operation of a fuel delivery system of a vehicle, comprising:

attenuating pressure pulsations travelling from a higher pressure fuel pump to a lower pressure fuel pump via a check valve internally integrated into an elastic multi-layer gasoline fuel line between the higher pressure fuel pump and the lower pressure fuel pump, the check valve including an external housing having a first peripheral surface with a greater diameter than an unstretched inner diameter of the elastic multi-layer gasoline fuel line and a second peripheral surface not coupled to the elastic multi-layer gasoline fuel line and including a leading edge of an upstream end having a curved tapered leading surface, where a divergent angle of the curved tapered leading surface extending from the upstream end of the check valve is between 20° and 40°, and where the curved tapered leading surface is spaced away from the elastic fuel line and tapers away from an inner surface of the elastic fuel line even where the fuel line narrows due to its elastic expansion from the check valve inserted therein, where the elastic fuel line is coupled to a quick connect downstream of the check valve, wherein an elasticity of the elastic multi-layer gasoline fuel line is greater than an elasticity of the check valve.

17. The method of claim 16, where the check valve is configured to enable fuel flow therethrough when a fuel pressure in the elastic multi-layer fuel line exceeds about 10 kpa.

\* \* \* \* \*